(12) United States Patent
Takayanagi et al.

(10) Patent No.: US 10,800,489 B2
(45) Date of Patent: Oct. 13, 2020

(54) STRADDLED VEHICLE

(71) Applicant: YAMAHA HATSUDOKI KABUSHIKI KAISHA, Iwata-shi, Shizuoka-ken (JP)

(72) Inventors: Tomokazu Takayanagi, Shizuoka (JP); Joji Sawaoka, Shizuoka (JP); Kazuyuki Maeda, Shizuoka (JP); Kosuke Hirata, Shizuoka (JP); Naoki Kitamura, Shizuoka (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 211 days.

(21) Appl. No.: 15/994,146

(22) Filed: May 31, 2018

(65) Prior Publication Data

US 2018/0346070 A1    Dec. 6, 2018

(30) Foreign Application Priority Data

Jun. 2, 2017   (JP) ................. 2017-110487

(51) Int. Cl.
  *B62M 25/08*  (2006.01)
  *B62K 23/04*  (2006.01)
  (Continued)

(52) U.S. Cl.
  CPC ............. *B62M 25/08* (2013.01); *B62K 23/02* (2013.01); *B62K 23/04* (2013.01); *B62K 23/06* (2013.01);
  (Continued)

(58) Field of Classification Search
  CPC ........ B62M 7/02; B62M 25/02; B62M 25/04; B62M 25/08; B62K 23/00; B62K 23/06
  (Continued)

(56) References Cited

U.S. PATENT DOCUMENTS 4,869,332 A * 9/1989 Fujita .................... B62M 23/00
                                                180/65.22
4,923,028 A * 5/1990 Yamashita ............... B62M 7/00
                                                180/219

(Continued)

FOREIGN PATENT DOCUMENTS

JP    H10-329781 A    12/1998
JP    H11-78554 A     3/1999
(Continued)

*Primary Examiner* — Tony H Winner
(74) *Attorney, Agent, or Firm* — Rabin & Berdo, P.C.

(57) ABSTRACT

A rider operates a driving source switching lever to switch an operation mode to a normal traveling mode or an auxiliary moving mode. During the normal traveling mode, a motorcycle travels by a driving force generated by an engine. During the auxiliary moving mode, the motorcycle moves at a low speed by a driving force generated by a vehicle driving motor. When the rider operates a forward-backward movement operator during the auxiliary moving mode to put the forward-backward movement operator in a forward movement instruction state, the vehicle driving motor is controlled such that the motorcycle moves forward. When the rider operates the forward-backward movement operator during the auxiliary moving mode to put the forward-backward movement operator in a backward movement instruction state, the vehicle driving motor is controlled such that the motorcycle moves backward.

11 Claims, 8 Drawing Sheets

(51) Int. Cl.
  *B62M 11/06* (2006.01)
  *G05G 1/04* (2006.01)
  *G05G 5/05* (2006.01)
  *B62K 23/02* (2006.01)
  *B62M 23/02* (2010.01)
  *B62M 7/02* (2006.01)
  *B62K 23/06* (2006.01)

(52) U.S. Cl.
  CPC .............. *B62M 7/02* (2013.01); *B62M 11/06* (2013.01); *B62M 23/02* (2013.01); *G05G 1/04* (2013.01); *G05G 5/05* (2013.01); *G05G 2505/00* (2013.01)

(58) Field of Classification Search
  USPC .......................................... 180/218, 219, 220
  See application file for complete search history.

(56) References Cited

U.S. PATENT DOCUMENTS

| | | | | |
|---|---|---|---|---|
| 7,311,636 B1 * | 12/2007 | Regula | ..................... | B62M 7/02 475/326 |
| 8,919,479 B1 * | 12/2014 | Langlands | ............. | B62M 23/02 180/219 |
| 2002/0038578 A1 * | 4/2002 | Nonaka | ................... | B62K 11/14 74/661 |
| 2006/0032688 A1 * | 2/2006 | Sanchez | ................. | B62M 23/02 180/219 |
| 2010/0077884 A1 * | 4/2010 | Ono | ....................... | B60K 17/04 74/473.36 |
| 2011/0042157 A1 * | 2/2011 | Rioux | ................... | B62K 5/027 180/218 |

FOREIGN PATENT DOCUMENTS

| | | |
|---|---|---|
| JP | 3731163 B1 | 1/2006 |
| JP | 2006-051853 A | 2/2006 |
| JP | 2010-120597 A | 6/2010 |
| JP | 2011-031837 A | 2/2011 |
| JP | 2012-162095 A | 8/2012 |
| JP | 2013-035430 A | 2/2013 |
| JP | 2014-108636 A | 6/2014 |
| JP | 2016-037255 A | 3/2016 |
| JP | 6002166 B2 | 10/2016 |

* cited by examiner

STRADDLED VEHICLE

BACKGROUND OF THE INVENTION

Field of the Invention

The present invention relates to a straddled vehicle that can move forward or backward at a low speed.

Description of Related Art

When a rider parks a motorcycle, it is necessary to move the motorcycle at a low speed. Conventionally, motorcycles, which can be easily operated so as to move forward or backward at a low speed, have been developed. For example, a motorcycle described in JP 10-329781 A can move forward or backward by a driving force of an assist motor.

In this motorcycle, a pair of stays is attached to a handlebar, and two front and rear load sensors are provided between the handlebar and a left stay, and two front and rear load sensors are provided between the handlebar and a right stay. When the rider parks the motorcycle in a garage or when the rider pushes the handlebar to move the motorcycle on a sidewalk, an operation force applied to the handlebar is detected by the four load sensors. A driving force for forward and backward movements by an assist motor is determined based on a result of calculation of detection values of the four load sensors. In this case, when a shift position of a transmission is in neutral, an engine is stopped, and a vehicle speed is equal to or lower than a predetermined value, a clutch for the assist motor is connected, and a driving force of the assist motor is transmitted to the drive wheel.

When the motorcycle described in JP 10-329781 A moves forward or backward by the driving force of the assist motor, it is necessary for the rider to apply a force to the handlebar. In this case, when the force applied to the handle bar from rider's hands fluctuates due to irregularities or inclination of a ground surface, the motorcycle may move differently from rider's intention. Further, the motorcycle automatically switches between traveling by the driving force of the engine and moving by the driving force of the assist motor according to a shift position, a state of the engine and a vehicle speed.

The rider sometimes desires to move the motorcycle forward and backward at a low speed and switch the motorcycle between being driven by the engine and the assist motor.

SUMMARY

An object of the present invention is to provide a straddled vehicle that can switch between moving forward and backward by a driving force of a motor, and can switch between being driven by an engine and a motor.

(1) A straddled vehicle according to one aspect of the present invention includes a vehicle main body, an engine that generates a driving force for a forward movement of the vehicle main body, a starter motor that starts the engine, an engine output operator that is operable by a rider to adjust an output of the engine, a vehicle driving motor that generates a driving force for forward and backward movements of the vehicle main body, and a driving motor controller that controls the vehicle driving motor. The straddled vehicle further includes a driving source switch system that is switchable between a first mode where the vehicle main body moves forward by a driving force generated by the engine and a second mode where the vehicle main body moves forward or backward by a driving force generated by the vehicle driving motor, a driving source switching operator that is operable by the rider to switch the driving source switch system between the first mode and the second mode, a handlebar that is to be gripped by a rider's hand, and a forward-backward movement operator that is provided at the handlebar separately from the engine output operator. The forward-backward movement operator is configured to be operable to be in first and second states, and the driving motor controller, in the case where the driving source switch system is in the second mode, and the forward-backward movement operator is operated to be in the first state, rotates the vehicle driving motor in a direction such that the vehicle main body moves forward, and in the case where the driving source switch system is in the second mode, and the forward-backward movement operator is operated to be in the second state, rotates the vehicle driving motor in a direction such that the vehicle main body moves backward.

In the straddled vehicle, the rider operates the driving source switching operator, so that the driving source switch system is switched to the first mode or the second mode. The engine is started by the starter motor. When the driving source switch system is in the first mode, the vehicle main body moves forward by the driving force generated by the engine. On the other hand, when the driving source switch system is in the second mode, the vehicle main body moves forward or backward by the driving force generated by the vehicle driving motor. When the driving source switch system is in the second mode, and the forward-backward movement operator is operated by the rider to be in the first state, the vehicle driving motor is controlled by the driving motor controller such that the vehicle main body moves forward. When the driving source switch system is in the second mode, and the forward-backward movement operator is operated by the rider to be in the second state, the vehicle driving motor is controlled by the driving motor controller such that the vehicle main body moves backward.

Further, the engine output operator and the forward-backward movement operator are provided independently from each other, so that the rider can clearly discriminate an operation of adjusting an output of the engine and an operation of moving the vehicle main body forward or backward by the vehicle driving motor.

Therefore, according to the rider's intention, the vehicle can switch between moving forward and backward by the driving force of the motor and can switch between being driven by the engine and the motor.

(2) The driving motor controller may control a moving speed of the vehicle main body by the driving force of the vehicle driving motor such that the moving speed is lower than an average speed of a walking person.

In this case, during the movement of the vehicle main body by the driving force of the vehicle driving motor, the vehicle main body moves at a speed lower than an average speed of a walking person. Thus, the rider can easily move the straddled vehicle forward and backward in a small space.

(3) The driving motor controller may control a moving speed of the vehicle main body by the driving force of the vehicle driving motor such that the moving speed is lower than 4 km/h.

In this case, during the movement of the vehicle main body by the driving force of the vehicle driving motor, the vehicle main body moves at a speed lower than 4 km/h, so that the rider can easily move the straddled vehicle forward and backward in a small space.

(4) The straddled vehicle may have a wheel provided at the vehicle main body to be rotatable, wherein the forward-backward movement operator may change to the first state and the second state by a rotating operation. The rotating operation may include a rotation of the forward-backward movement operator in a first direction when the rider sets the forward-backward movement operator in the first state, and a rotation of the forward-backward movement operator in a second direction when the rider sets the forward-backward movement operator in the second state. The first direction may be the same as a rotation direction of the wheel when the vehicle main body moves forward, and the second direction may be the same as a rotation direction of the wheel when the vehicle main body moves backward.

In this case, the rider operates the forward-backward movement operator in a direction that is the same as the rotation direction of the wheel when the vehicle main body moves forward or backward. Therefore, the rider can identify the operation direction intuitively.

When a radius of gyration of the rotating operation of the forward-backward movement operator is infinite, the forward-backward movement operator performs a straight line moving operation. Therefore, the rotating operation of the forward-backward movement operator includes the straight line moving operation. When the forward-backward movement operator performs the straight line moving operation, the first and second directions correspond to the moving directions of the forward-backward movement operator in the plan view of the vehicle. When the forward-backward movement operator performs the straight line moving operation, the rotation direction of the wheel corresponds to the moving direction of the wheel in the plan view of the vehicle.

(5) The forward-backward movement operator may have a first portion corresponding to the first state and a second portion corresponding to the second state, the first portion may be located at a position farther forward than the second portion in a vehicle front-and-rear direction, and the forward-backward movement operator may be put in the first state when the first portion is operated, and may be put in the second state when the second portion is operated.

In this case, the rider operates the first portion that is the front portion of the forward-backward movement operator, thereby being able to easily move the straddled vehicle forward by the vehicle driving motor, and the rider operates a second portion that is the rear portion of the forward-backward movement operator, thereby being able to easily move the straddled vehicle backward by the vehicle driving motor.

(6) The forward-backward movement operator may include a single operator that is operable to be in the first state and the second state.

In this case, the rider can easily move the straddled vehicle forward or backward by operating the single operator.

(7) The single operator may have a neutral state, the forward-backward movement operator may include a biasing element that biases the single operator in the neutral state when being operated to be in the first state and the second state, and the driving motor controller does not have to activate the vehicle driving motor when the single operator is in the neutral state.

In this case, when the rider does not operate the single operator, the single operator is automatically put in the neutral state. Thus, when the rider does not operate the single operator, the forward or backward movement of the vehicle main body by the vehicle driving motor automatically ends. Therefore, it is unnecessary for the rider to operate the single operator to end the forward or backward movement of the vehicle main body by the vehicle driving motor.

(8) The forward-backward movement operator may be provided to be operable with one or a plurality of fingers of a hand gripping the handlebar.

In this case, the rider can easily operate the forward-backward movement operator while gripping the handlebar.

(9) The handlebar may have a pair of left and right grips, and the forward-backward movement operator may be provided between one grip of the pair of grips and a center portion of the vehicle in a vehicle width direction.

In this case, the rider can easily operate the forward-backward movement operator with a hand gripping the one grip.

(10) A vertical plane passing through the center portion of the vehicle in the vehicle width direction may be defined, and a first space and a second space sectioned by the vertical plane may be defined, the engine output operator and another grip of the pair of grips may be provided in the first space, and the forward-backward movement operator may be provided at a position closer to the one grip than a middle position between the one grip and a center portion of the vehicle in the vehicle width direction.

In this case, the rider can operate the forward-backward movement operator while gripping the grip in the second space that is opposite to the first space in which the engine output operator is provided. Thus, the rider's intention of selecting which electric motor drives the motorcycle becomes clearer.

(11) The driving source switching operator and the forward-backward movement operator may be provided in the second space.

In this case, the rider can operate the forward-backward movement operator continuously after operating the driving source switching operator while gripping the portion in the first space of the handlebar.

Other features, elements, characteristics, and advantages of the present invention will become more apparent from the following description of preferred embodiments of the present invention with reference to the attached drawings.

DETAILED DESCRIPTION

A straddled vehicle according to embodiments of the present invention will be described below with reference to drawings. In the following description, a motorcycle is described as one example of the straddled vehicle.

(1) Schematic Configuration of Motorcycle

Figure 1:
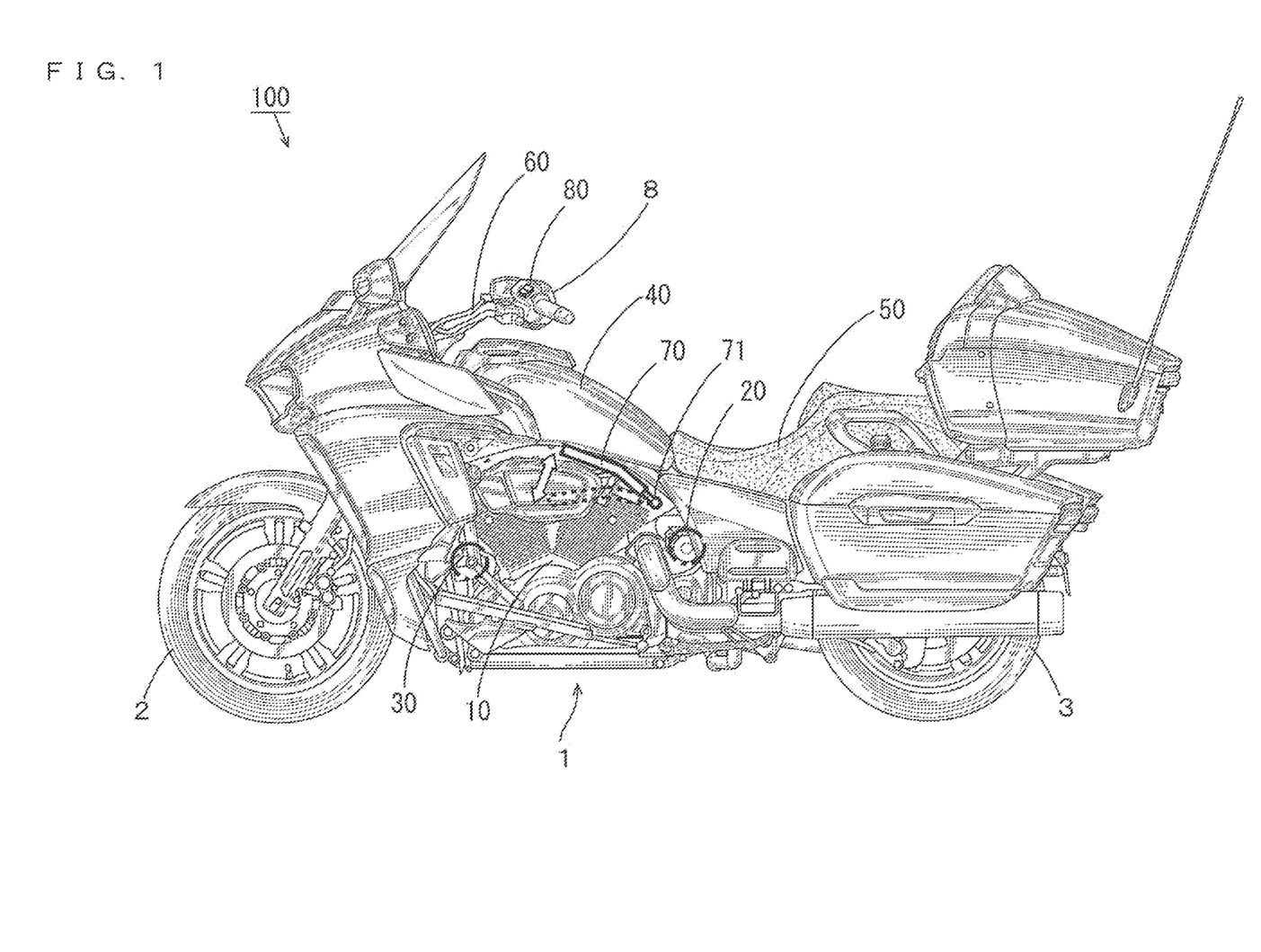
FIG. 1 is a side view of a motorcycle according to one embodiment of the present invention.

FIG. 1 is a side view of the motorcycle according to one embodiment of the present invention. In FIG. 1, the motorcycle 100 standing up to be perpendicular to the road surface is shown.

A front wheel 2 and a rear wheel 3 are rotatably provided at a vehicle main body 1 of the motorcycle 100 of FIG. 1. The vehicle main body 1 includes a V-type engine 10, a vehicle driving motor 20 and a starter motor 30. The vehicle driving motor 20 and the starter motor 30 are electric motors operated by electric power. A fuel tank 40 is arranged above the engine 10, and a seat 50 is arranged at a position farther rearward than the fuel tank 40.

A driving source switching lever 70 is provided below the fuel tank 40. As indicated by an outlined arrow, the driving source switching lever 70 is attached to a shaft 71 to be swingable upward and downward. A rider operates the driving source switching lever 70 to selectively switch an operation mode of the motorcycle 100 between a normal traveling mode and an auxiliary moving mode. During the normal traveling mode, the motorcycle 100 travels by a driving force generated by the engine 10. During the auxiliary moving mode, the motorcycle 100 moves forward or backward at a constant low speed by a driving force generated by the vehicle driving motor 20.

With a front end of the driving source switching lever 70 in close proximity to a lower edge of the fuel tank 40, the operation mode is set to the normal traveling mode. During the normal traveling mode, the rider is normally seated on the seat 50 and places his or her legs forward and downward. At this time, because the front end of the driving source switching lever 70 is located in an upper position, the rider's leg is unlikely to come into contact with the driving source switching lever 70. With the front end of the driving source switching lever 70 spaced apart downward from the lower edge of the fuel tank 40, the operation mode is set to the auxiliary moving mode. During the auxiliary moving mode, the rider is seated on the seat 50 and places his or her legs substantially vertically to the road surface. Therefore, the rider's leg does not come into contact with the driving source switching lever 70.

Hereinafter, a state of the driving source switching lever 70 for setting the operation mode to the normal traveling mode is referred to as an engine driving state, and a state of the driving source switching lever 70 for setting the operation mode to the auxiliary moving mode is referred to as a motor driving state. A forward movement of the motorcycle 100 during the normal traveling mode by a driving force of the engine 10 is referred to as traveling. A forward or backward movement of the motorcycle 100 at a low speed during the auxiliary moving mode by a driving force of the vehicle driving motor 20 is referred to as moving. Further, a speed at which the motorcycle 100 moves forward during the normal traveling mode is referred to as a traveling speed, and a speed at which the motorcycle 100 moves forward or backward during the auxiliary moving mode is referred to as a moving speed.

A handle 60 is provided at a position farther forward than the fuel tank 40. An operation unit 8 is provided at the handle 60. The operation unit 8 includes a forward-backward movement operator 80. The rider operates the forward-backward movement operator 80 in order to carry out the switch between the forward and backward movements of the motorcycle 100 during the auxiliary moving mode.

Figure 2:
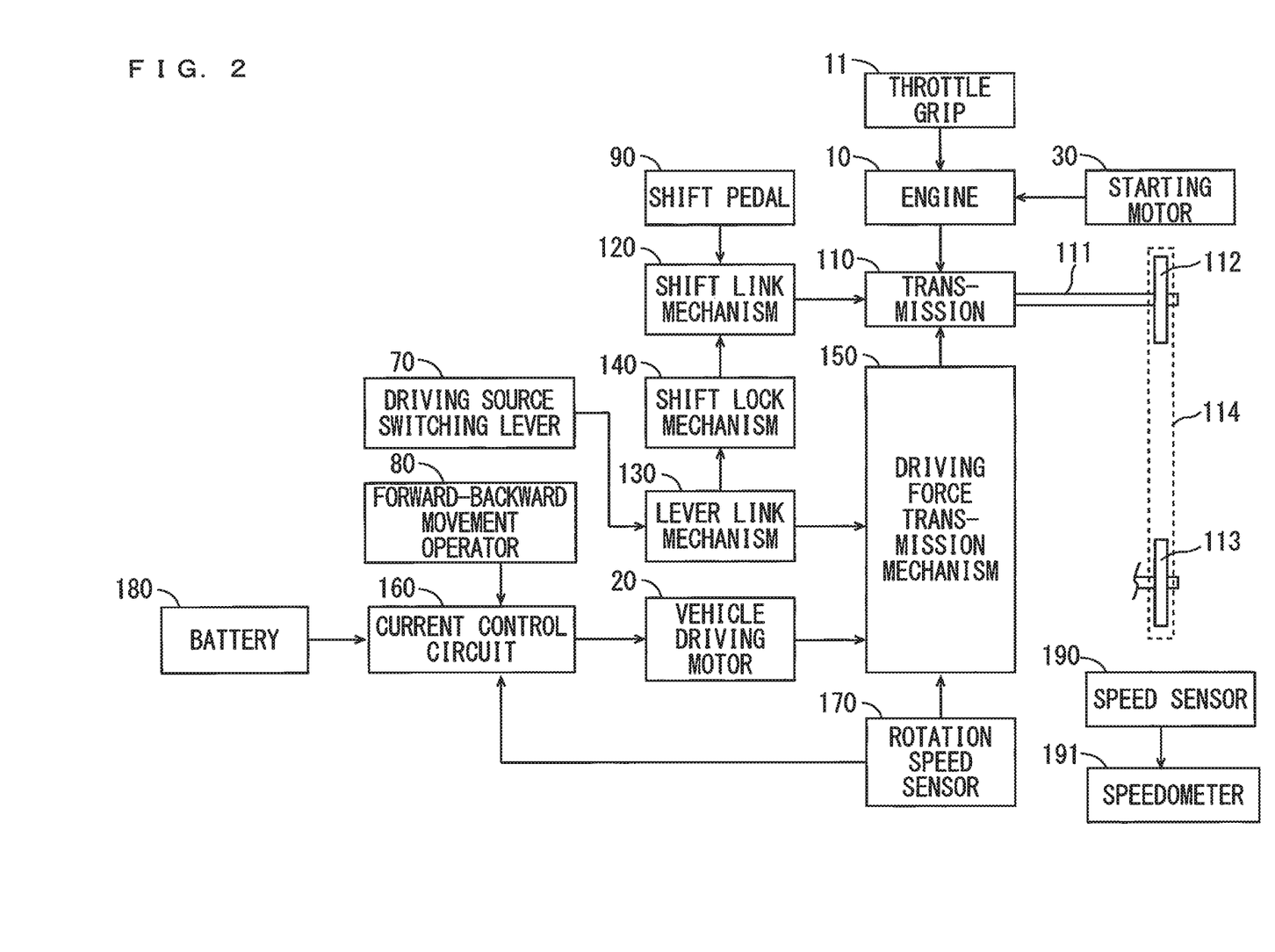
FIG. 2 is a schematic diagram showing configurations of a motive power transmission system and an electric control system of the motorcycle of FIG. 1.

(2) Configurations of Motive Power Transmission System and Electric Control System FIG. 2 is a schematic diagram showing the configurations of the motive power transmission system and the electric control system of the motorcycle 100 of FIG. 1. In FIG. 2, the starter motor 30 is used to rotate a crankshaft of the engine 10 during the start-up of the engine 10. The rider adjusts a rotation speed of the engine 10 by operating a throttle grip 11 during the normal traveling mode.

When the operation mode is set to the normal traveling mode by the driving source switching lever 70, a driving force of the crankshaft of the engine 10 is transmitted to a driving shaft 111 via a transmission 110. A driving sprocket 112 is attached to the driving shaft 111. A driven sprocket 113 is attached to the rear wheel 3 of FIG. 1. A chain 114 is wound around the driving sprocket 112 and the driven sprocket 113. During the normal traveling mode, a driving force of the engine 10 is transmitted to the rear wheel 3. An operation of a shift pedal 90 is transmitted to the transmission 110 by a shift link mechanism 120. Thus, a shift position of the transmission 110 is changed.

The state of the driving source switching lever 70 is transmitted to a shift lock mechanism 140 and a driving force transmission mechanism 150 by a lever link mechanism 130. When the driving source switching lever 70 is set in the motor driving state, the shift lock mechanism 140 locks the shift position of the transmission 110 in neutral. Thus, the driving force of the engine 10 is not transmitted to the driving shaft 111.

When the driving source switching lever 70 is set in the engine driving state, the driving force transmission mechanism 150 does not transmit a driving force of the vehicle driving motor 20 to the driving shaft 111. In this case, the transmission 110 transmits a driving force of the engine 10 to the driving shaft 111. On the other hand, when the driving source switching lever 70 is set in the motor driving state, the driving force transmission mechanism 150 transmits the driving force of the vehicle driving motor 20 to the driving shaft 111.

A rotation speed sensor 170 detects a rotation speed of a specific gear, described below, in the driving force transmission mechanism 150. A battery 180 supplies electric power to a current control circuit 160. The current control circuit 160 controls an electric current that is supplied to the vehicle driving motor 130 based on a state of the forward-backward movement operator 80 and a rotation speed detected by the rotation speed sensor 170.

A speed sensor 190 detects a rotation speed of the front wheel 2 or the rear wheel 3 of FIG. 1 to detect a traveling speed of the motorcycle 100. The traveling speed detected by the speed sensor 190 is displayed on a speedometer 191.

(3) Driving Force Transmission Mechanism 150 and Current Control Circuit 160

Figure 3:
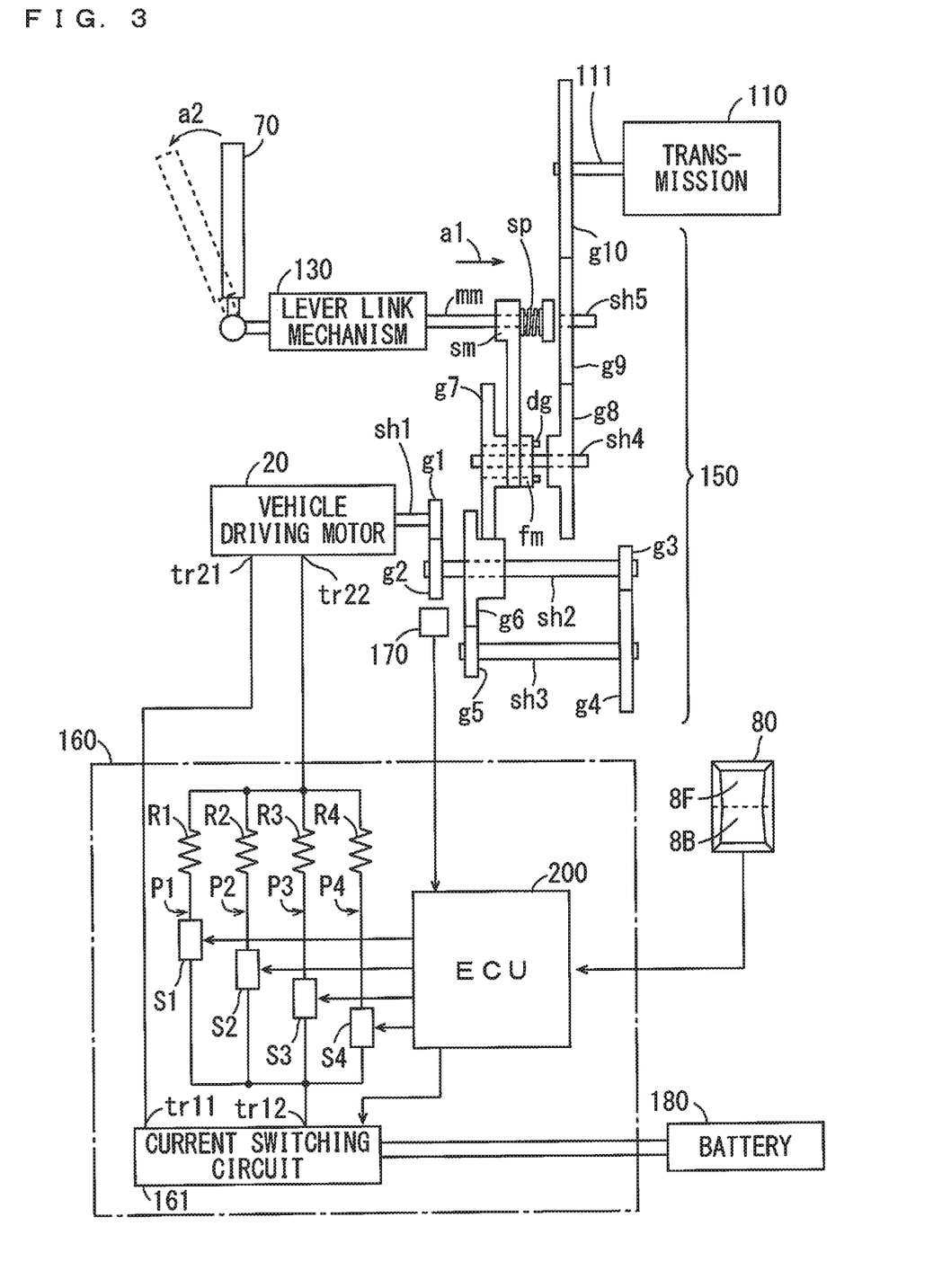
FIG. 3 is a diagram mainly showing configurations of a driving force transmission mechanism and a current control circuit of FIG. 2.

FIG. 3 is a diagram mainly showing configurations of the driving force transmission mechanism 150 and the current control circuit 160 of FIG. 2. As shown in FIG. 3, the driving force transmission mechanism 150 includes a plurality of rotation shafts sh1 to sh5, a plurality of gears g1 to g10, an engaging member fm, a movable member mm, a switching member sm and a spring sp.

The gear g1 is fixed to the rotation shaft sh1 of the vehicle driving motor. In the present example, the rotation shaft sh1 and the gear g1 are constituted by an integrally formed single member. The gears g2, g3 are fixed to the rotation shaft sh2. In the present example, the rotation shaft sh2 and the gear g3 are constituted by an integrally formed single member. The gear g1 and the gear g2 are engaged with each other. The gears g4, g5 are fixed to the rotation shaft sh3. In the present example, the rotation shaft sh3 and the gear g5 are constituted by an integrally formed single member. The gear g3 and the gear g4 are engaged with each other. The gear g6 is provided to be rotatable relative to the rotation shaft sh2. The gear g5 and the gear g6 are engaged with each other. The gear g7 is provided to be rotatable about the rotation shaft sh4. The gear g6 and the gear g7 are engaged with each other.

The gear g7 is provided to be movable integrally with the switching member sm and the engaging member fm along the rotation shaft sh4. The engaging member fm has a plurality of dogs dg. Similarly to the gear g7, the gear g8 is provided to be rotatable relative to the rotation shaft sh4. In the gear g8, a plurality of recesses that can be engaged with the plurality of dogs dg of the engaging member fm are provided. The gear g9 is provided to be rotatable relative to the rotation shaft sh5. The gear g8 and the gear g9 are engaged with each other. The gear g10 is fixed to the driving shaft 111 to which the transmission 110 is connected. The gear g9 and the gear g10 are engaged with each other. The gears g1 to g10 and the rotation shafts sh1 to sh5 function as a reduction gear that decelerates a rotation speed of the vehicle driving motor 20. In the engaging member fm, an inner-diameter spline or an outer-diameter spline may be provided instead of the plurality of dogs dg. In this case, in the gear g8, an outer-diameter spline or an inner-diameter spline are provided instead of the plurality of recesses.

When the driving source switching lever 70 is in the engine driving state as indicated by solid lines, the movable member mm and the switching member sm are biased by the spring sp in an axial direction. When the driving source switching lever 70 is in the motor driving state as indicated by dotted lines, the movable member mm and the switching member sm are moved by the lever link mechanism 130 in the axis direction indicated by an arrow a1 against a biasing force of the spring sp.

Here, transmission of the driving force of the vehicle driving motor 20 will be described. A rotational force of the rotation shaft sh1 of the vehicle driving motor 20 is transmitted to the rotation shaft sh2 by the gears g1, g2, and a rotational force of the rotation shaft sh2 is transmitted to the rotation shaft sh3 by the gears g3, g4. A rotational force of the rotation shaft sh3 is transmitted to the gear g7 by the gears g5, g6.

When the driving source switching lever 70 is set in the engine driving state as indicated by the solid lines, the movable member mm and the switching member sm are biased by the spring sp. Thus, the dogs dg are not engaged with the recesses of the gear g8. When the outer-diameter spline and the inner-diameter spline are provided in the engaging member fm and the gear g8 instead of the dogs dg and the recesses, the outer-diameter spline and the inner-diameter spline are not fitted to each other. Therefore, a rotational force of the gear g7 is not transmitted to the gear g8. Therefore, the driving force of the vehicle driving motor 20 is not transmitted to the driving shaft 111.

When the driving source switching lever 70 switches to the motor driving state as indicated by an arrow a2, the movable member mm and the switching member sm move against the biasing force of the spring sp. Thus, the plurality of dogs dg of the engaging member fm are engaged with the plurality of recesses of the gear g8. When the outer-diameter spline and the inner-diameter spline are provided in the engaging member fm and the gear g8 instead of the dogs dg and the recesses, the outer-diameter spline and the inner-diameter spline are fitted to each other. As a result, a rotational force of the gear g7 is transmitted to the gear g8 and the rotation shaft sh4. A rotational force of the rotation shaft sh4 is transmitted to the rotation shaft sh5 by the gears g8, g9, and a rotational force of the rotation shaft sh5 is transmitted to the driving shaft 111 by the gears g9, g10. Therefore, a driving force of the vehicle driving motor 20 is transmitted to the driving shaft 111.

In the present embodiment, a merging portion between a driving force transmission path from the engine 10 to the rear wheel 3 and a driving force transmission path from the vehicle driving motor 20 to the rear wheel 3 is the driving shaft 111. A resolving power with which the rotation speed sensor 170 detects a high rotation speed is larger than a resolving power with which the rotation speed sensor 170 detects a low rotation speed. In the present embodiment, the rotation speed sensor 170 detects a rotation speed of the gear g2 in the reduction gear from the vehicle driving motor 20 to the driving shaft 111. Thus, when the driving shaft 111 rotates at a low speed, a high rotation speed can be detected accurately.

Next, current control of the vehicle driving motor 20 will be described. The current control circuit 160 is constituted by a plurality of resistances R1 to R4, a plurality of switches S1 to S4, a current switching circuit 161 and an ECU (Electric Control Unit) 200. The switches S1 to S4 are relays, for example. The resistances R1 to R4 are connected to the switches S1 to S4 in series, respectively. A current path P1 is constituted by the resistance R1 and the switch S1, a current path P2 is constituted by the resistance R2 and the switch S2, a current path P3 is constituted by the resistance R3 and the switch S3, and a current path P4 is constituted by the resistance R4 and the switch S4.

A terminal tr21 of the vehicle driving motor 20 is connected to a terminal tr11 of the current switching circuit 161. The current paths P1 to P4 are connected to one another to be arranged in parallel with one another between a terminal tr22 of the vehicle driving motor 20 and a terminal tr12 of the current switching circuit 161. Electric power is supplied to the current switching circuit 161 from the battery 180.

The rotation speed sensor 170 detects a rotation speed of the gear g2 of the driving force transmission mechanism 150. The rotation speed detected by the rotation speed sensor 170 is supplied to the ECU 200. The ECU 200 switches on and off of the switches S1 to S4 based on the rotation speed supplied from the rotation speed sensor 170. Thus, a current that is supplied to the vehicle driving motor 20 is controlled. The rotation speed detected by the rotation speed sensor 170 is proportional to a moving speed of the motorcycle 100 during the auxiliary moving mode.

The current control circuit 160 controls the vehicle driving motor 20 such that the moving speed of the motorcycle 100 is close to or coincides with the preset target speed. The target speed is preferably set equal to or lower than an average speed of a walking person. In this case, the rider can easily move the motorcycle 100 forward or backward in a small space. Specifically, the target speed is preferably set higher than 0 km/h and lower than 4 km/h, and more preferably set higher than 0 km/h, and equal to or lower than 2 km/h. In this case, the rider can move the motorcycle 100 forward and backward more easily in a small space. For example, the target speed is 0.9 km/h.

The forward-backward movement operator 80 is operated by the rider to be in a first state or a second state. The first state corresponds to the forward movement in the auxiliary moving mode, and the second state corresponds to the backward movement in the auxiliary moving mode. The forward-backward movement operator 80 is biased to be in a neutral state between the first state and the second state. Therefore, when the rider does not operate the forward-backward movement operator 80, the forward-backward movement operator 80 maintains the neutral state.

In the present embodiment, the forward-backward movement operator 80 has a first portion 8F and a second portion 8B. The first portion 8F and the second portion 8B are arranged in a front position and a rear position in a vehicle front-and-rear direction, respectively. The first state is a state where the first portion 8F is depressed, and a second state is a state where the second portion 8B is depressed. The ECU 200 detects whether the forward-backward movement operator 80 is in the first state or the second state, and instructs the current switching circuit 161 to switch directions of the current based on the result of detection.

Hereinafter, a state where the first portion 8F of the forward-backward movement operator 80 is depressed is referred to as a forward movement instruction state, and a state where the second portion 8B is depressed is referred to as a backward movement instruction state.

When the first portion 8F is operated such that the forward-backward movement operator 80 is in the forward movement instruction state, the current control circuit 160 rotates the vehicle driving motor 20 in one direction such that the motorcycle 100 moves forward. When the second portion 8B is operated such that the forward-backward movement operator 80 is in the backward movement instruction state, the current control circuit 160 rotates the vehicle driving motor 20 in an opposite direction such that the motorcycle 100 moves backward.

(4) Configuration of Handle

Figure 4:
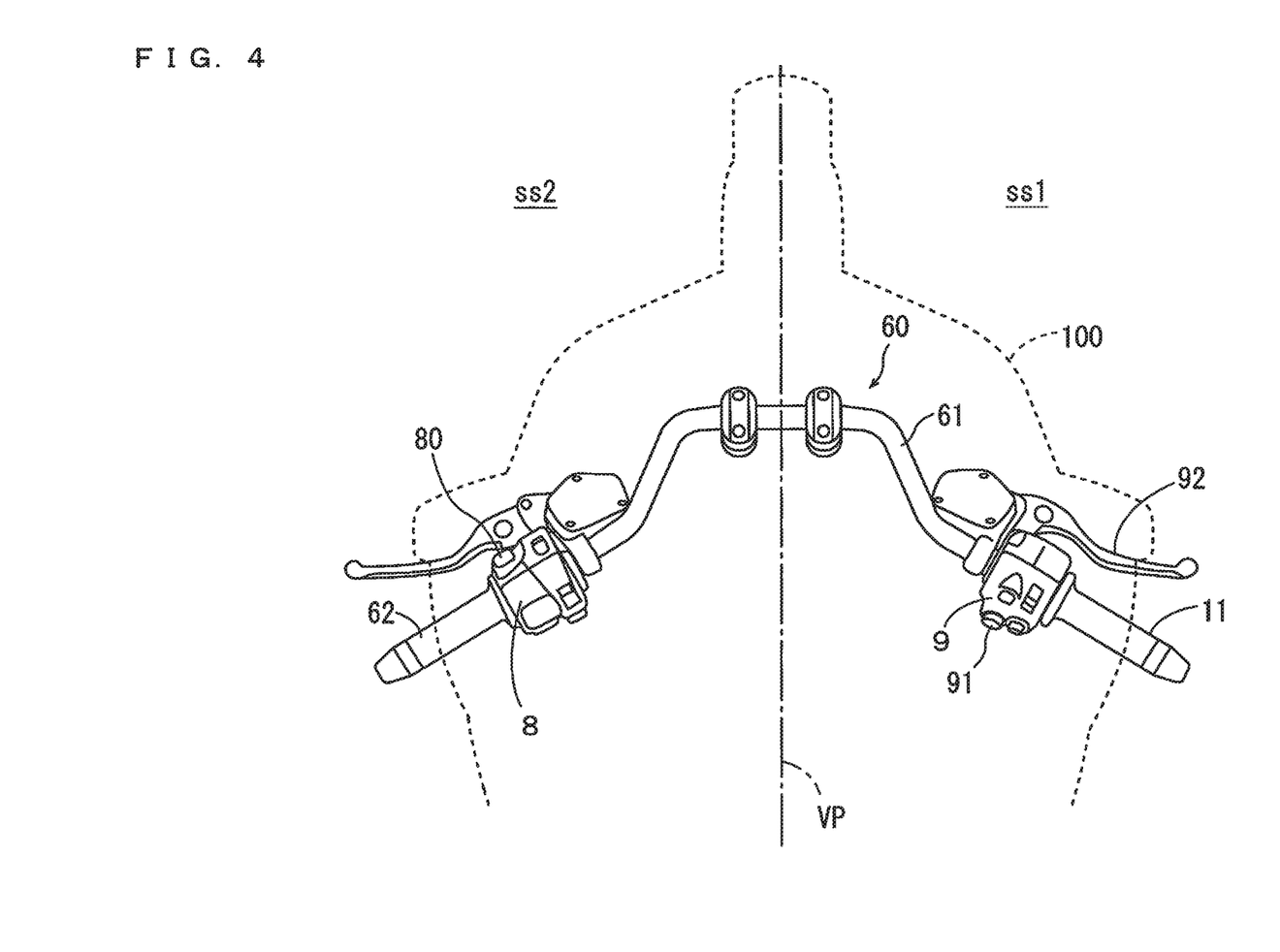
FIG. 4 is a plan view of a handle of the motorcycle of FIG. 1.

FIG. 4 is a plan view of the handle 60 of the motorcycle 100 of FIG. 1. The handle 60 of FIG. 4 has a handlebar 61 extending to the left and right of the vehicle main body 1. Left and right portions of the handlebar 61 may be integrally formed, or the left portion and the right portion may be separated from each other. In FIG. 4, the outer shape of the motorcycle 100 is indicated by a dotted line. Further, a vertical plane VP passing through a center portion of the vehicle in a vehicle width direction is indicated by a one-dot and dash line.

A grip 62 is provided at a left end of the handlebar 61. The throttle grip 11 is provided at a right end of the handlebar 61. The operation unit 8 is attached to the handlebar 61 to be adjacent to the grip 62. The forward-backward movement operator 80 is provided at the operation unit 8. An operation unit 9 is attached to the handlebar 61 to be adjacent to the throttle grip 11. In the operation unit 9, a starter button 91, which the rider operates to activate the starter motor 30 of FIG. 2, is provided. Further, a brake lever 92 is attached to the handlebar 61 to be positioned at a position farther forward than the throttle grip 11.

Here, as shown in FIG. 4, the space is sectioned into a first space ss1 on the right and a second space ss2 on the left by the vertical plane VP, for example. The first space ss1 and the second space ss2 are defined. In this case, the operation unit 9 and the throttle grip 11 are provided in the first space ss1, and the operation unit 8 and the grip 62 are provided in the second space ss2.

Figure 5:
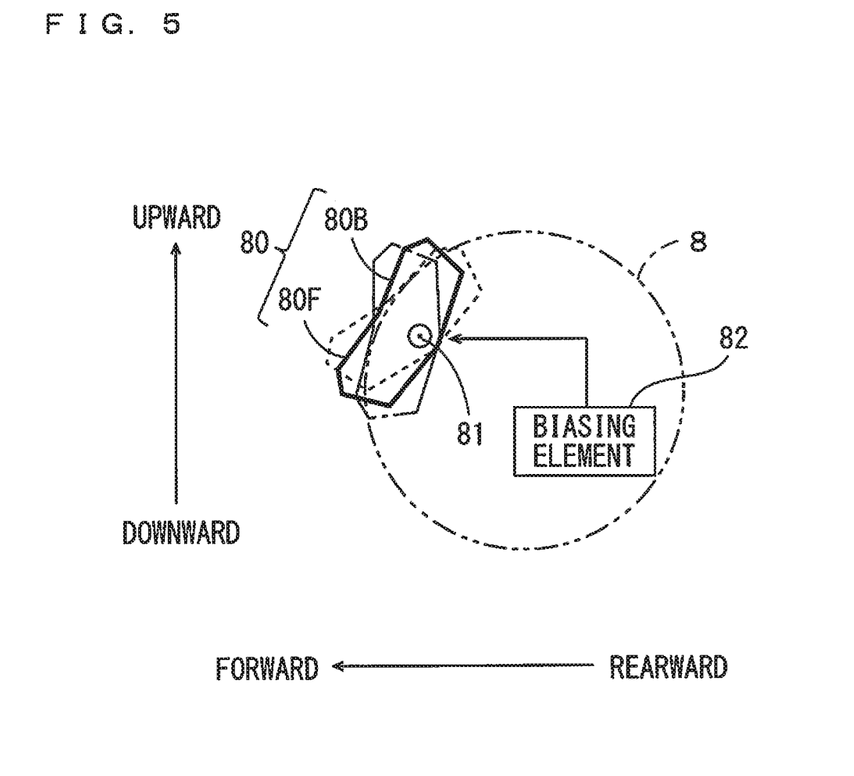
FIG. 5 is a schematic side view showing one example of a forward-backward movement operator.

FIG. 5 is a schematic side view showing one example of the forward-backward movement operator 80. As shown in FIG. 5, the forward-backward movement operator 80 is attached to an upper front portion of the operation unit 8 to be rotatable about a rotation shaft 81 substantially in parallel with the vehicle width direction. The forward-backward movement operator 80 changes to the forward movement instruction state and the backward movement instruction state by the rotating operation. The forward-backward movement operator 80 is biased in the neutral state by a biasing element 82. The biasing element 82 is constituted by an elastic member such as a spring, for example.

In FIG. 5, the forward-backward movement operator 80 in the neutral state is drawn by a thick solid line. A first portion 80F and a second portion 80B of the forward-backward movement operator 80 are operated by the index finger of the rider's left hand gripping the grip of FIG. 4. When the rider depresses the first portion 80F of the forward-backward movement operator 80 with the index finger of his or her left hand, the forward-backward movement operator 80 is set by the rotating operation in the forward movement instruction state indicated by a one-dot and dash line. When the rider depresses the second portion 80B of the forward-backward movement operator 80 with the index finger of his or her left hand, the forward-backward movement operator 80 is set by the rotating operation in the backward movement instruction state indicated by a dotted line. With such a configuration, the rider can easily operate the forward-backward movement operator 80 with the index finger of his or her left hand while gripping the grip 62 of the handle 60 with his or her left hand.

A rotation direction of the forward-backward movement operator 80 when the rider sets the forward-backward movement operator 80 in the forward movement instruction state is the same as the rotation direction of the front wheel 2 and the rear wheel 3 when the motorcycle 100 moves forward. The rotation direction of the forward-backward movement operator 80 when the rider sets the forward-backward movement operator 80 in the backward movement instruction state is the same as the rotation direction of the front wheel 2 and the rear wheel 3 when the motorcycle 100 moves backward. Therefore, the rider identifies an operation direction of the forward-backward movement operator 80 intuitively and easily during the auxiliary moving mode.

(5) Effects of Embodiment

In the motorcycle 100 according to the present embodiment, when the rider operates the driving source switching lever 70, the operation mode is switched to the normal traveling mode or the auxiliary moving mode. During the normal traveling mode, the motorcycle 100 travels by a driving force generated by the engine 10. On the other hand, during the auxiliary moving mode, the motorcycle 100 moves at a low speed by a driving force generated by the vehicle driving motor 20. When the rider operates the forward-backward movement operator 80 during the auxiliary moving mode to put the forward-backward movement operator 80 in the forward movement instruction state, the vehicle driving motor 20 is controlled by the current control circuit 160 to move the motorcycle 100 forward. When the rider operates the forward-backward movement operator 80 during the auxiliary moving mode to put the forward-backward movement operator 80 in the backward movement instruction state, the vehicle driving motor 20 is controlled by the current control circuit 160 to move the motorcycle 100 backward.

Therefore, according to the rider's intention, the vehicle can switch between moving forward and backward by the driving force of the vehicle driving motor 20, and can switch between being driven by the engine 10 and the vehicle driving motor 20.

Further, because the rider operates the forward-backward movement operator 80 in a direction that is the same as the rotation direction of the front wheel 2 and the rear wheel 3 when the motorcycle 100 moves forward or backward, the rider identifies the operation direction easily and intuitively.

Further, because the forward-backward movement operator 80 is provided to be operable with one finger of the rider's hand gripping the handle bar 61, the rider can easily operate the forward-backward movement operator 80 while gripping the handle bar 61.

Further, when the rider does not operate the forward-backward movement operator 80, the forward-backward movement operator 80 is automatically put in the neutral state. Thus, when the rider does not operate the forward-backward movement operator 80, a forward or backward movement of the motorcycle 100 by the vehicle driving motor 20 automatically ends. Therefore, it is unnecessary for the rider to operate the forward-backward movement operator 80 to end the forward or backward movement of the motorcycle 100 by the vehicle driving motor 20.

Further, in the present embodiment, because the vehicle driving motor 20 is provided separately from the starter motor 30, a transmission path of the driving force during the normal traveling mode and a transmission path of the driving force during the auxiliary moving mode can be separated. Therefore, the configuration of the driving force transmission mechanism 150 can be simplified.

(6) Other Examples of Forward-Backward Movement Operator 80

Figure 6:
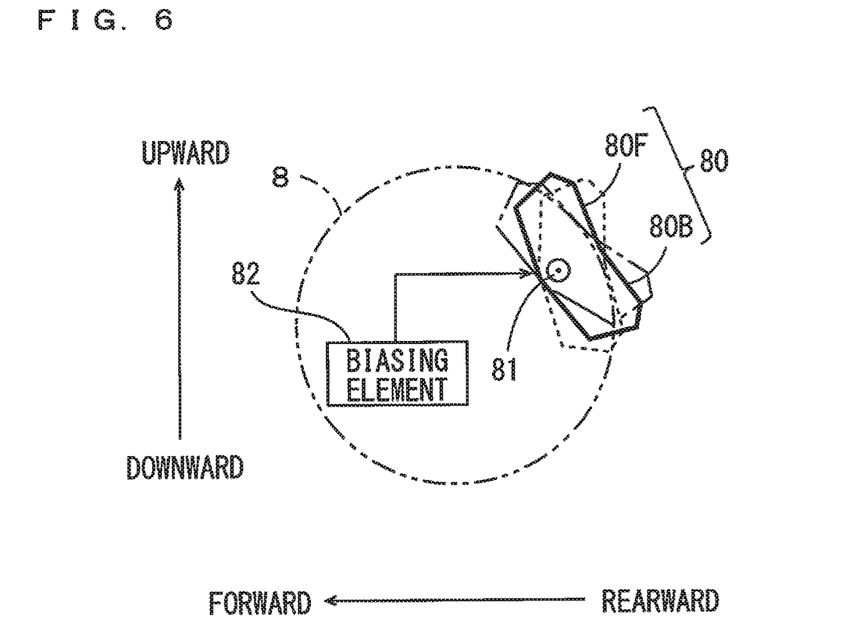
FIG. 6 is a schematic side view showing a first other example of the forward-backward movement operator.

FIG. 6 is a schematic side view showing the first other example of a forward-backward movement operator 80. As shown in FIG. 6, the forward-backward movement operator 80 is attached to an upper rear portion of an operation unit 8 to be rotatable about a rotation shaft 81 that is substantially in parallel with the vehicle width direction. Also in the present example, the forward-backward movement operator 80 changes to a forward movement instruction state and a backward movement instruction state by a rotating operation. The forward-backward movement operator 80 is biased in a neutral state by a biasing element 82.

In FIG. 6, the forward-backward movement operator 80 in the neutral state is drawn by a thick solid line. A first portion 80F and a second portion 80B of the forward-backward movement operator 80 are operated by the thumb of the rider's left hand gripping the grip of FIG. 4. When the rider depresses the first portion 80F of the forward-backward movement operator 80 with the thumb of his or her left hand, the forward-backward movement operator 80 is set by the rotating operation in the forward movement instruction state indicated by a one-dot and dash line. When the rider depresses the second portion 80B of the forward-backward movement operator 80 with the thumb of his or her left hand, the forward-backward movement operator 80 is set by the rotating operation in the backward movement instruction state indicated by a dotted line. In such a configuration, the rider can easily operate the forward-backward movement operator 80 with one finger of his or her left hand while gripping a grip 62 of a handle 60 with his or her left hand.

Also in the present example, a rotation direction of the forward-backward movement operator 80 in the case where the rider sets the forward-backward movement operator 80 in the forward movement instruction state is the same as the rotation direction of the front wheel 2 and the rear wheel 3 in the case where the motorcycle 100 moves forward. The rotation direction of the forward-backward movement operator 80 in the case where the rider sets the forward-backward movement operator 80 in the backward movement instruction state is the same as the rotation direction of the front wheel 2 and the rear wheel 3 in the case where the motorcycle 100 moves backward. Therefore, the rider identifies the operation direction of the forward-backward movement operator 80 easily and intuitively during the auxiliary moving mode.

Figure 7:
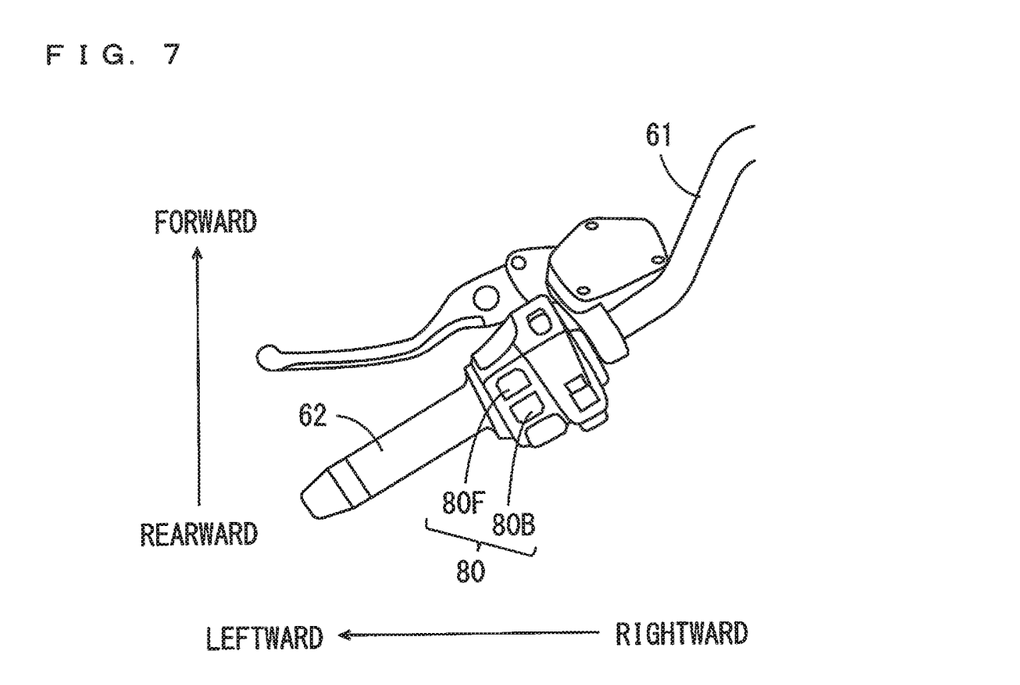
FIG. 7 is a schematic perspective view showing a second other example of the forward-backward movement operator.

FIG. 7 is a schematic perspective view showing the second other example of a forward-backward movement operator 80. In FIG. 7, a first portion 80F and a second portion 80B of the forward-backward movement operator 80 are separated. In the example of FIG. 7, when the rider depresses the first portion 80F of the forward-backward movement operator 80 with the thumb or the index finger of his or her left hand, the forward-backward movement operator 80 is set in the forward movement instruction state. When the rider depresses the second portion 80B of the forward-backward movement operator 80 with the thumb or the index finger of his or her left hand, the forward-backward movement operator 80 is set in the backward movement instruction state. The first portion 80F and the second portion 80B are biased in a neutral state (a state where the first portion 80F and the second portion 80B are not depressed). Therefore, when the depression of the first portion 80F is released, the first portion 80F returns to the previous state. Similarly, when the depression of the second portion 80B is released, the second portion 80B returns to the previous state. Therefore, it is unnecessary for the rider to operate the forward-backward movement operator 80 to end the forward or backward movement of the motorcycle 100 by the vehicle driving motor 20.

With such a configuration, the rider can easily operate the forward-backward movement operator 80 with one finger of his or her left hand while gripping the grip 62 of the handle 60 with his or her left hand.

In the present example, the first portion 80F is located at a position farther forward than the second portion 80B. The first portion 80F corresponds to the forward movement of the motorcycle 100, and the second portion 80B corresponds to the backward movement of the motorcycle 100. Therefore, the rider identifies the operation direction of the forward-backward movement operator 80 easily and intuitively during the auxiliary moving mode.

Figure 8:
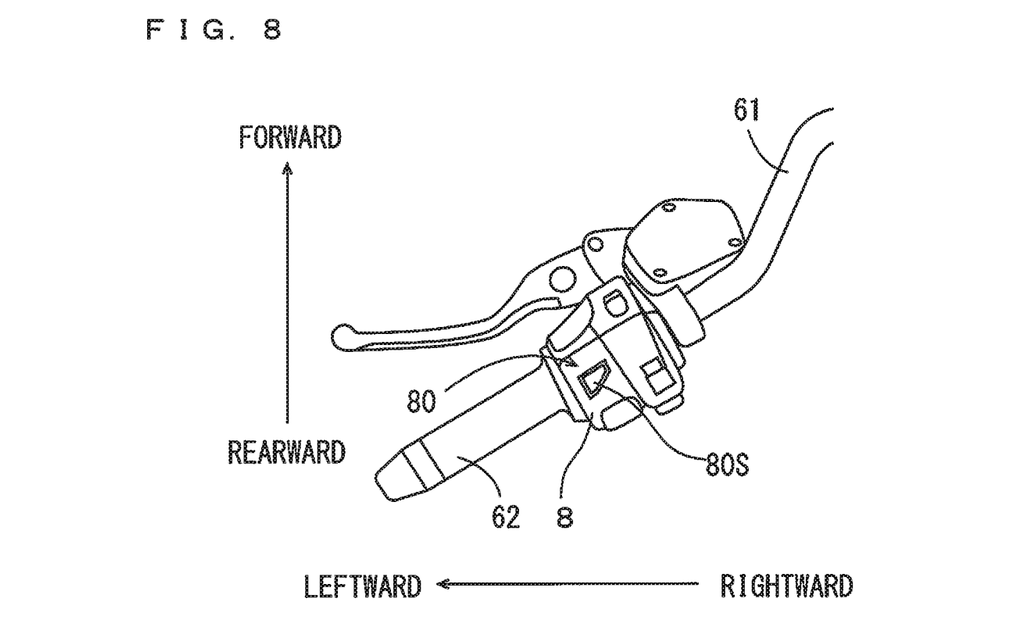
FIG. 8 is a schematic perspective view showing a third other example of the forward-backward movement operator.
Figure 9:
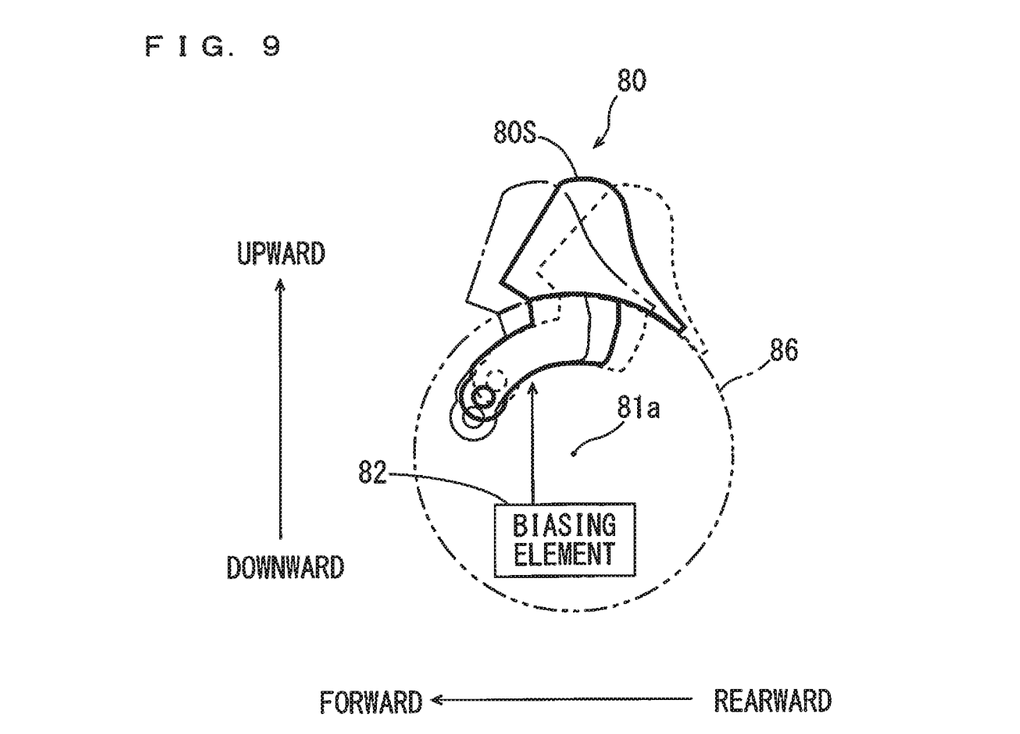
FIG. 9 is a schematic side view of the forward-backward movement operator of FIG. 8.

FIG. 8 is a schematic perspective view showing the third other example of a forward-backward movement operator 80, and FIG. 9 is a schematic side view of the forward-backward movement operator 80 of FIG. 8. As shown in FIGS. 8 and 9, the forward-backward movement operator 80 has a single operation portion 80S. The forward-backward movement operator 80 is attached to an operation unit 8 to be rotatable about a virtual axis 81a that is substantially in parallel with the vehicle width direction. The forward-backward movement operator 80 changes to the forward movement instruction state and the backward movement instruction state by the rotating operation. In this case, the forward-backward movement operator 80 can slide along a virtual circle 86 centered at the virtual axis 81a. Thus, the forward-backward movement operator 80 can move forward and backward in the vehicle front-and-back direction in a plan view. The forward-backward movement operator 80 is biased in the neutral state by a biasing element 82.

In FIG. 9, the forward-backward movement operator 80 in the neutral state is drawn by a thick solid line. The operation portion 80S of the forward-backward movement operator 80 is operated with the thumb or the index finger of his or her left hand gripping the grip of FIG. 4. When the rider presses the operation portion 80S of the forward-backward movement operator 80 forward with the thumb or the index finger of his or her left hand, the forward-backward movement operator 80 is set by the rotating operation in the forward movement instruction state indicated by a one-dot and dash line. When the rider pulls the operation portion 80S of the forward-backward movement operator 80 with the thumb or the index finger of his or her left hand, the forward-backward movement operator 80 is set by the rotating operation in the backward movement instruction state indicated by a dotted line. With such a configuration, the rider can easily operate the forward-backward movement operator 80 with one finger of his or her left hand while gripping the grip 62 of the handle 60 with his or her left hand.

Figure 10:
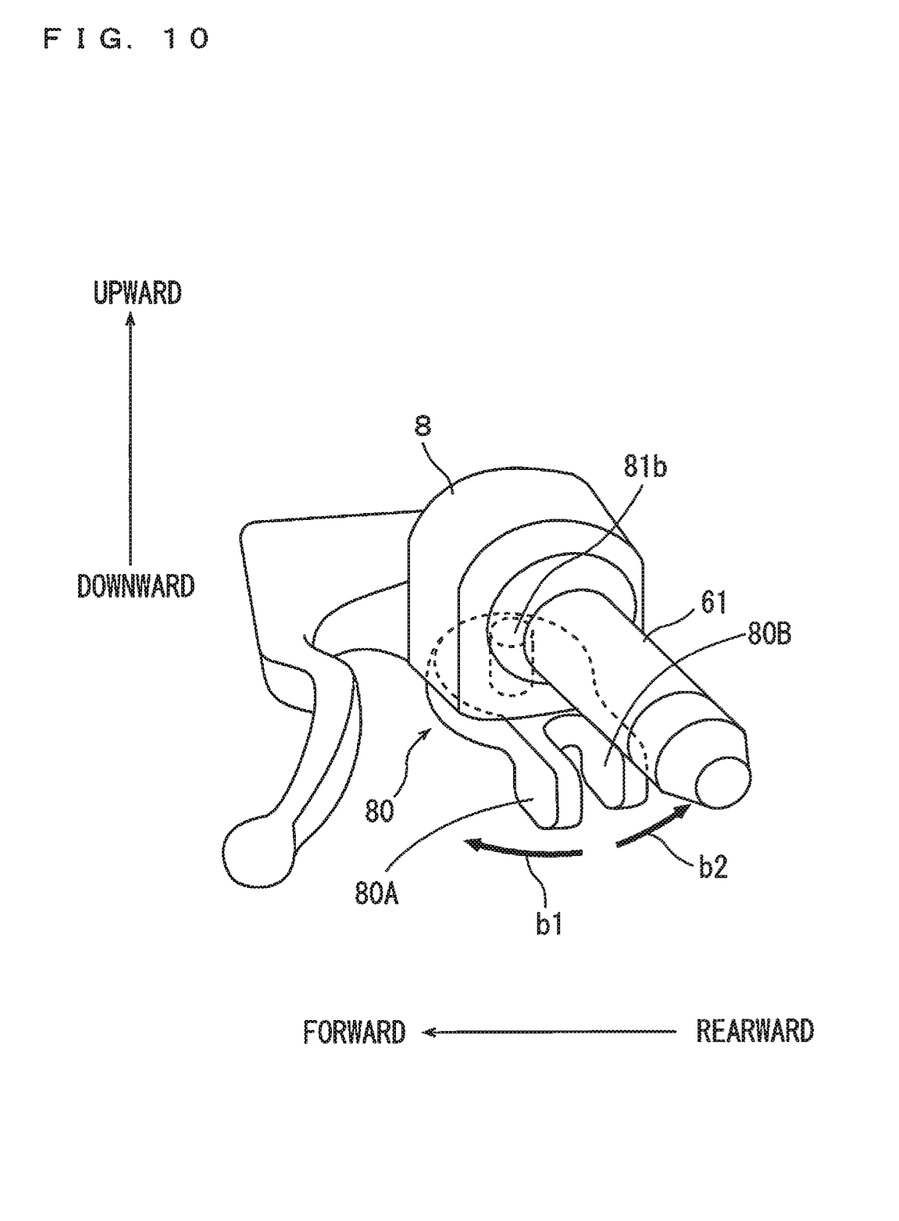
FIG. 10 is a schematic perspective view showing a fourth other example of the forward-backward movement operator.

FIG. 10 is a schematic perspective view showing the fourth other example of a forward-backward movement operator 80. In the example of FIG. 10, the forward-backward movement operator 80 is attached to a lower portion of an operation unit 8 to be rotatable about a rotation shaft 81b substantially in parallel with a top-and-bottom direction. Also in the present example, the forward-backward movement operator 80 changes to a forward movement instruction state and a backward movement instruction state by a rotating operation. The forward-backward movement operator 80 has two operation portions 80A, 80B and is biased in a neutral state by a biasing element. FIG. 10 shows the forward-backward movement operator 80 in the neutral state.

When the rider presses the operation portion 80B forward as indicated by an arrow b1 with the thumb of his or her left hand, the forward-backward movement operator 80 is set in the forward movement instruction state. When the rider pulls the operation portion 80A backward as indicated by an arrow b2 with the index finger of his or her left hand, the forward-backward movement operator 80 is set in the backward movement instruction state. In such a configuration, the rider can easily operate the forward-backward movement operator 80 with two fingers of his or her left hand while gripping the grip 62 of the handle 60 with his or her left hand.

In the present example, a moving direction of the forward-backward movement operator 80 when the rider sets the forward-backward movement operator 80 in the forward movement instruction state is the same as the direction in which the motorcycle 100 moves when moving forward. A moving direction of the forward-backward movement operator 80 when the rider sets the forward-backward movement operator 80 in the backward movement instruction state is the same as the direction in which the motorcycle 100 moves when moving backward. Therefore, the rider identifies the operation direction of the forward-backward movement operator 80 easily and intuitively during the auxiliary moving mode.

(7) Other Embodiments (a) While the rear wheel 3 is driven by a driving force of the engine 10 or a driving force of the vehicle driving motor 20 in the above-mentioned embodiment, the present invention is not limited to this. For example, a rear wheel 3 may be driven by a driving force of an engine 10, and a front wheel 2 may be driven by a driving force of a vehicle driving motor 20.

(b) The arrangement of the vehicle driving motor 20 is not limited to the arrangement in the above-mentioned embodiment. For example, the vehicle driving motor 20 may be a hub motor provided in a hub of a front wheel 2. In this case, a clutch for connecting and disconnecting a transmission path of a driving force generated by an engine 10 and a clutch for connecting and disconnecting a transmission path of a driving force generated by a vehicle driving motor 20 are provided at separate locations, and the both clutches are controlled by a control device to operate in association with each other.

(c) The forward-backward movement operator 80 of FIGS. 5 to 9 is set in the forward movement instruction state and the backward movement instruction state by the rotating operation. However, when a radius of gyration of a rotating operation is infinite, the forward-backward movement operator 80 performs a straight line moving operation. Therefore, the rotating operation of the forward-backward movement operation 80 in the embodiment of the present invention includes a sliding operation in a straight line. For example, when the rider moves the front portion of the forward-backward movement operator 80 forward, the forward-backward movement operator 80 may be in the forward movement instruction state. When the rider moves the rear portion of the forward-backward movement operator 80 backward, the forward-backward movement operator 80 may be in the backward movement instruction state.

Further, when the rider moves the front portion of the forward-backward movement operator 80 downward, the forward-backward movement operator 80 may be in the forward movement instruction state. When the rider moves the rear portion of the forward-backward movement operator 80 downward, the forward-backward movement operator 80 may be in the backward movement instruction state.

(d) While the above-mentioned embodiment is an example in which the present invention is applied to the motorcycle, the invention is not limited to this. The present invention may be applied to another vehicle such as a four-wheeled automobile, a motor tricycle or an ATV (All Terrain Vehicle).

(8) Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the motorcycle 100 is an example of a straddled vehicle, the throttle grip 11 is an example of an engine output operator, the current control circuit 160 is an example of a driving motor controller, the transmission 110 and the driving force transmission mechanism 150 are examples of a driving source switch system, the driving source switching lever 70 is an example of a driving source switching operator, the front wheel 2 or the rear wheel 3 is an example of a wheel, and the grip 62 and the throttle grip 11 are examples of a pair of grips.

As each of constituent elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A straddled vehicle comprising:
a vehicle main body;
an engine configured to generate a driving force for a forward movement of the vehicle main body;
a starter motor configured to start the engine;
a throttle grip for a rider to adjust an output of the engine;
a vehicle driving motor configured to generate a driving force for forward and backward movements of the vehicle main body;
a driving motor controller configured to control the vehicle driving motor;
a driving source switch system that is switchable between a first mode where the vehicle main body moves forward by a driving force generated by the engine and a second mode where the vehicle main body moves forward or backward by the driving force generated by the vehicle driving motor;
a driving source switching lever for the rider to switch the driving source switch system between the first mode and the second mode;
a handlebar configured for a rider's hand; and
a forward-backward movement switch that is provided at the handlebar separately from the throttle grip, wherein:
the forward-backward movement switch is configured to be operable to be in a first or a second state, and
the driving motor controller is configured to,
    in a case where the driving source switch system is in the second mode, and the forward-backward movement switch is operated to be in the first state, rotate the vehicle driving motor in a direction such that the vehicle main body moves forward, and
    in a case where the driving source switch system is in the second mode, and the forward-backward movement switch is operated to be in the second state, rotate the vehicle driving motor in a direction such that the vehicle main body moves backward.

2. The straddled vehicle according to claim 1, wherein the driving motor controller is further configured to control a moving speed of the vehicle main body by the driving force of the vehicle driving motor such that the moving speed is higher than 0 km/h and lower than 4 km/h.

3. The straddled vehicle according to claim 1, wherein the driving motor controller is further configured to control a moving speed of the vehicle main body by the driving force of the vehicle driving motor such that the moving speed is lower than 4 km/h.

4. The straddled vehicle according to claim 1, having a wheel provided at the vehicle main body to be rotatable, wherein:
the forward-backward movement switch is configured to change to the first state or the second state by a rotating operation,
the rotating operation includes a rotation of the forward-backward movement switch in a first direction to set the forward-backward movement switch to be in the first state, and
a rotation of the forward-backward movement switch in a second direction to set the forward-backward movement switch to be in the second state,
the first direction is a same direction as a rotation direction of the wheel when the vehicle main body moves forward, and
the second direction is a same direction as a rotation direction of the wheel when the vehicle main body moves backward.

5. The straddled vehicle according to claim 1, wherein:
the forward-backward movement switch has a first portion corresponding to the first state and a second portion corresponding to the second state,
the first portion is located at a position farther forward than the second portion in a vehicle front-and-rear direction, and
the forward-backward movement switch is configured to be put in the first state when the first portion is operated, and is configured to be put in the second state when the second portion is operated.

6. The straddled vehicle according to claim 1, wherein the forward-backward movement switch includes a single body that is operable to be in the first state or the second state.

7. The straddled vehicle according to claim 6, wherein:
the single body has a neutral state,
the forward-backward movement switch includes a biasing element configured to bias the single body to be in the neutral state when being operated to be in the first state or the second state, and
the driving motor controller does not activate the vehicle driving motor when the single body is in the neutral state.

8. The straddled vehicle according to claim 1, wherein the forward-backward movement switch is provided for one or a plurality of fingers of a hand gripping the handlebar.

9. The straddled vehicle according to claim 1, wherein the handlebar has a pair of left and right grips, and
the forward-backward movement switch is provided between one of the left and right grips and a center portion of the vehicle in a vehicle width direction.

10. The straddled vehicle according to claim 9, wherein a vertical plane passing through the center portion of the vehicle in the vehicle width direction is defined, and a first space and a second space sectioned by the vertical plane are defined,
the throttle grip and another grip of the left and right grips are provided in the first space, and
the forward-backward movement switch is provided at a position closer to the one grip than a middle position between the one grip and the center portion of the vehicle in the vehicle width direction.

11. The straddled vehicle according to claim 10, wherein the driving source switching lever and the forward-backward movement switch are provided in the second space.

* * * * *